Patented Sept. 23, 1930

1,776,720

UNITED STATES PATENT OFFICE

HERMANN BOLLMANN, OF HAMBURG, GERMANY

PROCESS FOR THE PURIFICATION OF PHOSPHATIDES

No Drawing. Application filed September 4, 1926, Serial No. 133,729, and in Germany October 6, 1925.

This invention relates to an improved process for the purification of phosphatides.

The removal from phosphatides, recovered from vegetable substances, for instance oil seeds, such as soya beans or other legumes, by lixiviation with a mixture of alcohol and benzol and liberated from the main mass of the oil by the introduction of steam, of the bitter substances and the other undesirable flavouring materials dissolved with the said phosphatides, is attended by considerable difficulties. Hitherto it was effected by treating the phosphatides with suitable solvents, particularly acetone and alcohol. The removal of the solvents from the treated substances caused, however, very great difficulties, and, moreover, the loss of solvent was considerable because the necessary stages of the operation had to be carried out in vacuo.

The recovery of "crude phosphatides" may be carried out according to known processes, for example as described in U. S. Patent 1,464,557. Such a product will be considered as the starting material of the present process.

According to the present invention it has now been ascertained that the complete purification of the emulsion (consisting of the whole of the phosphatides, some neutral oil, free fatty acids, bitter substances and other undesirable flavouring materials together with water), can be effected without the employment of organic solvents if first the main mass of the oil is separated by centrifuging. In this centrifugation a large part of the fatty oil is separated, leaving a mixture containing the phosphatides, and certain impurities, including a little oil. This mass is then subjected to a distillation under reduced atmospheric pressure. In this manner the water contained in the phosphatides, accompanied by the bitter principles and other constituents influencing the taste in a detrimental manner, such as, for example, free fatty acids, distil over and no decomposition of the phosphatides apparently takes place.

Should the amount of water in the mixture under treatment be insufficient to ensure the complete distillation of the undesirable flavouring substances, then water is added to the mixture before the distillation, or steam is blown in during the distillation.

For purposes in which a mixture of phosphatides soluble in alcohol and phosphatides insoluble in alcohol can be employed and in which the quantity of oil still present is not of importance, for example as an addition to margarine, the phosphatides so purified may be utilized without further removal of the oil.

The total phosphatides so recovered consist of phosphatides soluble in alcohol (lecithin), phosphatides difficultly soluble in alcohol and phosphatides insoluble in alcohol. If it is desired to separate the whole of the phosphatides into their various classes, these are dissolved in strong alcohol heated to about 60° centigrade, the constituents remaining undissolved are separated out and the solution subjected to fractional cooling.

The following example will serve to illustrate how the invention can be carried into practice:

The crude mixture containing phosphatides recovered from soya beans together with their accompanying substances (which consist, up to 25% of the total quantity, of water), are heated in a vacuum apparatus to 60° centigrade. The bitter principles, free fatty acids and other substances influencing the taste in a detrimental manner distil over with the steam. If the quantity of water contained in the originating material is not sufficient to obtain the desired effect, water is added before the distillation, or steam is blown in during the distillation.

The product remaining has a pure taste and may be employed in this form in the manufacture of margarine.

If, however, it is desired to separate the mixture of phosphatides, after being freed from the undesirable flavouring materials, into their classes, then 100 parts, for example, of the total phosphatides produced as above described, are heated for about ten minutes at 60° C. in 400 parts by weight of alcohol (96 per cent. by volume). 48.3% of the phosphatides then remain undissolved. If the solution (after separation from the insoluble portion) is then cooled to about 40° C., 9% of the phosphatides precipitate out and on further cooling to 20° C. a further 12.6%; these fractions are each separated from the main solution. The solution now remaining gives, after evaporation of the solvent at reduced pressure, a residue amounting to 30% of the quantity employed and consisting of pure lecithin.

In order that the various fractions may be clarified the hot alcoholic solution may be treated, before the cooling is effected, with animal carbon or other decolourizing powder.

I claim:—

1. A process for the purification of vegetable phosphatides containing bad tasting constituents, which consists in subjecting an emulsion containing said phosphatides and water and other impurities to distillation under reduced pressure.

2. A process for the purification of phosphatides, which consists in separating the phosphatides, accompanied by water, oil, free fatty acids, bitter substances and other detrimental flavouring matters from the main quantity of oil by centrifugal means, and then subjecting the phosphatide-containing mixture to distillation under reduced pressure.

3. A process as claimed in claim 1, in which water is added to the emulsion or phosphatide-containing mixture subjected to vacuum distillation.

4. An improvement in the process as claimed in claim 1, which consists in treating the products resulting from the vacuum distillation with strong alcohol and heating; separating the undissolved matters; fractionally cooling the solution; and separating the products precipitating out during each cooling.

5. A process in which the alcoholic solutions of soluble phosphatides are treated with a decolorizing solid material and the alcoholic solution is thereafter cooled to precipitate the difficulty soluble phosphatides.

In testimony whereof I affix my signature.

HERMANN BOLLMANN.